United States Patent
Zhou et al.

(10) Patent No.: US 12,448,657 B2
(45) Date of Patent: Oct. 21, 2025

(54) HERICIUM ERINACEUS STRAIN HE015, MOLECULAR MARKERS AND USES THEREOF

(71) Applicants: INFINITUS (CHINA) COMPANY LTD., Guangdong (CN); INSTITUTE OF MICROBIOLOGY, GUANGDONG ACADEMY OF SCIENCES(GUANGDONG DETECTION CENTER OF MICROBIOLOGY), Guangdong (CN)

(72) Inventors: Yong Zhou, Guangdong (CN); Qingping Wu, Guangdong (CN); Manjun Cai, Guangdong (CN); Xiuying Kou, Guangdong (CN); Yuanchao Liu, Guangdong (CN); Xiaoxian Wu, Guangdong (CN); Huiping Hu, Guangdong (CN); Lijun Zhuo, Guangdong (CN); Jian Tang, Guangdong (CN); Qian Tao, Guangdong (CN); Yizhen Xie, Guangdong (CN); Zhi Zhang, Guangdong (CN)

(73) Assignees: INFINITUS (CHINA) COMPANY LTD., Guangdong (CN); INSTITUTE OF MICROBIOLOGY, GUANGDONG ACADEMY OF SCIENCES(GUANGDONG DETECTION CENTER OF MICROBIOLOGY), Guangdong (CN)

( * ) Notice: Subject to any disclaimer, the term of this patent is extended or adjusted under 35 U.S.C. 154(b) by 0 days.

(21) Appl. No.: 18/726,821

(22) PCT Filed: Apr. 26, 2024

(86) PCT No.: PCT/CN2024/090037
§ 371 (c)(1),
(2) Date: Jul. 5, 2024

(87) PCT Pub. No.: WO2025/200075
PCT Pub. Date: Oct. 2, 2025

(65) Prior Publication Data
US 2025/0305072 A1    Oct. 2, 2025

(30) Foreign Application Priority Data
Mar. 28, 2024  (CN) .......................... 202410361686.0

(51) Int. Cl.
*A01H 15/00*   (2006.01)
*C12Q 1/6869*  (2018.01)
*C12Q 1/6895*  (2018.01)

(52) U.S. Cl.
CPC .......... *C12Q 1/6895* (2013.01); *A01H 15/00* (2013.01); *C12Q 1/6869* (2013.01)

(58) Field of Classification Search
CPC ...................................... A01H 15/00
See application file for complete search history.

(56) References Cited

FOREIGN PATENT DOCUMENTS

WO    WO 2022/195581    * 9/2022    ............. A01H 15/00

OTHER PUBLICATIONS

Wang et al Critical Reviews in Food Science and Nutrition vol. 59, No. 51, pp. S96-S115 (Year: 2019).*
Yan Yang et al., "Comparison on Chemical Component and Biologic Activity of Hericium erinaceus Fruit body and Mycelial Eextracts", Journal of Fungal Research, vol. 4, 2006, pp. 15-19.

* cited by examiner

*Primary Examiner* — David H Kruse
(74) *Attorney, Agent, or Firm* — JCIPRNET

(57) ABSTRACT

The present invention discloses a new *Hericium erinaceus* strain HE015, and a molecular marker and use thereof. Wild fungi are widely collected throughout China and subjected to systematic strain breeding to obtain a new fine-quality *Hericium erinaceus* strain HE015. The strain HE015 was preserved in Guangdong Microbial Culture Collection Center on May 12, 2022 with an accession number of GDMCC No: 62464. The genetic background of the strain is obviously different from that of the existing *Hericium erinaceus* species; therefore, the new strain is of important value and significance in supplementing fine-quality cultivated *Hericium erinaceus* varieties, meeting the market demand and promoting high-quality development of the industry. The present invention further provides a specific molecular marker and a rapid detection method for detecting and identifying the strain HE015.

2 Claims, 5 Drawing Sheets
Specification includes a Sequence Listing.

SEQUENCE LISTING

```
Sequence total quantity: 12
SEQ ID NO: 1            moltype = DNA  length = 457
FEATURE                 Location/Qualifiers
source                  1..457
                        mol_type = genomic DNA
                        organism = Hericium erinaceus
SEQUENCE: 1
cctgcaagcc atcggacgta ttgagaagtc caaaatgaag acgaagaaag aaatcagtag    60
attgacaagc aagtgtcata agagttggtc tcgttgaagg agagccggac ttgtgcgcga   120
tatcgcagag caatggaagc gaaaagacgc gcatcgaagg agacgacgaa gggacgaaaa   180
aaagaaggag ggaagggggg gatgaagatg aagaaattga gaaaacagca tcggtggccg   240
caataatccc gtcggcgtag acacggaagc gaacaggaag cgagcgcagc gggtgtctga   300
agatacagac agtaatagca aaatgaacgc agcaatgttc cggtcggaag aaatggcaat   360
atggggcaa cgaatggaag gacaactcac aatgaaacgc actgatgcca attaatttgc     420
agattgagat cattcgtagg acgtagcgta gaccaag                             457

SEQ ID NO: 2            moltype = DNA  length = 426
FEATURE                 Location/Qualifiers
source                  1..426
                        mol_type = genomic DNA
                        organism = Hericium erinaceus
SEQUENCE: 2
cataggcctg tgtccacccg ggcaggccgc ccgggttttc ggggtgtaag atcatagctc    60
gctcccggcg gggccggttt tcggggttca gggtgtcgaa cctttaccgg gattatcagg   120
ggtcctcgtt acactcgcgt tacagttatt tatttattta acgttaggcg ctcaggaccc   180
gacagtgttc gggagtttac cggttttgaa catatatatg tacctccctc aatacgctaa   240
acaactgtct tctgtgtgag gtcagcaacg gagatcagat acctcccagc taaatattcg   300
aactgttcaa tttctcgggc agatttatct aaccggttat atgctatgga cgagcagata   360
agcgtctact taatccttct ggcccttgac gtccaacagc catttcccga cctcatttgc   420
ccattc                                                              426

SEQ ID NO: 3            moltype = DNA  length = 433
FEATURE                 Location/Qualifiers
source                  1..433
                        mol_type = genomic DNA
                        organism = Hericium erinaceus
SEQUENCE: 3
gcagtggtct caaaggccat cccaggcagc tatgacgagg ttcaggtgaa atatcgcagc    60
caaggcacct cttgcccatt gtatctacaa agcatactga aggacgaggc acacattgcc   120
tagtgccaca agtagaatca attttaagac agctgcccca gcaggtggta tcaaacgttt   180
caagaataga tcacaaatga ggtgttatct tacaatccca acatgtctgc atgcctacat   240
ctcatcaaca agaccacttt cccgaccagt gccctacaat ctatccaata tctccttcca   300
ttccttcaca aattcttgtt cacttggcag catttttgacc ttccattcga caatacctag   360
ctttccatgt gaattgcaca ctgcaagctc tctcaacttc ttctgatggg caccttttgtt  420
gctctgcagc acc                                                      433

SEQ ID NO: 4            moltype = DNA  length = 20
FEATURE                 Location/Qualifiers
source                  1..20
                        mol_type = other DNA
                        organism = unidentified
SEQUENCE: 4
gcagtggtct caaaggccat                                                20

SEQ ID NO: 5            moltype = DNA  length = 20
FEATURE                 Location/Qualifiers
source                  1..20
```

```
SEQUENCE: 5
gaaacttggt gctgcagagc                                                    20

SEQ ID NO: 6            moltype = DNA  length = 19
FEATURE                 Location/Qualifiers
source                  1..19
                        mol_type = other DNA
                        organism = unidentified
SEQUENCE: 6
cggggtctgg gatgagacc                                                     19

SEQ ID NO: 7            moltype = DNA  length = 21
FEATURE                 Location/Qualifiers
source                  1..21
                        mol_type = other DNA
                        organism = unidentified
SEQUENCE: 7
gaatgggcaa atgaggtcgg g                                                  21

SEQ ID NO: 8            moltype = DNA  length = 20
FEATURE                 Location/Qualifiers
source                  1..20
                        mol_type = other DNA
                        organism = unidentified
SEQUENCE: 8
cctgcaagcc atcggacgta                                                    20

SEQ ID NO: 9            moltype = DNA  length = 19
FEATURE                 Location/Qualifiers
source                  1..19
                        mol_type = other DNA
                        organism = unidentified
SEQUENCE: 9
cttggtctac gctacgtcc                                                     19

SEQ ID NO: 10           moltype = DNA  length = 594
FEATURE                 Location/Qualifiers
source                  1..594
                        mol_type = genomic DNA
                        organism = Hericium erinaceus
SEQUENCE: 10
gaaggatcat taatgaattt gaaaggagtt gttgctggcc tgaaacccag gcatgtgcac         60
gctccaatct catccatctt acacctgtgc acccttgcgt gggtccgtcg gctttgcggt        120
cgatgggctt gcgttttttca taaactctta tgtatgtaac agaatgtcat aatgctataa       180
acgcatctta tacaactttc aacaacggat ctcttgctcg tcgcatcgat gaagaacgca       240
gcgaaatgcg ataagtaatg tgaattgcag aattcagtga atcatcgaat ctttgaacgc       300
accttgcgcc ccttggtatt ccgagggggca cgcctgttcg agtgtcgtga aattctcaac       360
tcaatcctct tgttatgaga gggctgggct tggacttgga ggtcttgccg gtgctccctc       420
gggaagtcgg ctcctcttga atgcatgagt ggatctcttt tgtagggttt gcccttggtg       480
tgataattat ctacgccgcg ggtagccttg cgttggtctg cttctaaccg tcttcggaca       540
actttcatct caacttgacc tcgaatcagg cgggactacc cgctgaactt aagc             594

SEQ ID NO: 11           moltype = DNA  length = 19
FEATURE                 Location/Qualifiers
source                  1..19
                        mol_type = other DNA
                        organism = unidentified
SEQUENCE: 11
tccgtaggtg aacctgcgg                                                     19

SEQ ID NO: 12           moltype = DNA  length = 20
FEATURE                 Location/Qualifiers
source                  1..20
                        mol_type = other DNA
                        organism = unidentified
SEQUENCE: 12
tcctccgctt attgatatgc                                                    20
```

HERICIUM ERINACEUS STRAIN HE015, MOLECULAR MARKERS AND USES THEREOF

CROSS-REFERENCE TO RELATED APPLICATION

This application is a 371 of international application of PCT application serial no. PCT/CN2024/090037, filed on Apr. 26, 2024 which claims the priority benefit of China application no. 202410361686.0, filed on Mar. 28, 2024. The entirety of each of the above mentioned patent applications is hereby incorporated by reference herein and made a part of this specification.

REFERENCE TO A SEQUENCE LISTING

The instant application contains a Sequencing Listing which has been submitted electronically in XML file and is hereby incorporated by reference in its entirety. Said XML copy, created on Feb. 4, 2025, is named 146646-us-Sequence Listing and is 13,574 bytes in size.

TECHNICAL FIELD

The present invention belongs to the technical field of microbial edible fungi. Specifically, the present invention relates to a new *Hericium erinaceus* strain HE015, a molecular marker, HE015 extracts and uses thereof.

RELATED ART

*Hericium erinaceus* (Bull. ex Fr.) Pers., also called monkey's head mushroom, lion's mane mushroom, or hedgehog mushroom, belongs to *Hericium*, Hericiaceae, Russulales, Basidiomycetes, Basidiomycota, Kingdom Fungi. *Hericium erinaceus* is a kind of famous and precious edible and medical mushroom; it has a long edible history, known as "a delicacy from mountains like the edible bird's nest from seas" and is rich in multiple nutritional components. It is believed by traditional Chinese medical science that *Hericium erinaceus* is neutral in nature, sweet in taste, aids digestion and benefits the five internal organs; it has efficacies of invigorating stomach, tonifying deficiency, anticancer, and tonifying kidney essence and thus, is a kind of good medicine for treating digestive system diseases and easing stomachache. Experiments show that *Hericium erinaceu* polysaccharide has efficacies of boosting immunity, inhibiting digestive system neoplasms, anti-gastric ulcers, regulating blood sugar level, and so on. It has been an important raw material to develop functional foods, health-care products, and medicines.

Germplasm resources are the basis for industry development. However, compared with a large amount edible fungi such as *Lentinus edodes* and *Pleurotus ostreatus*, *Hericium erinaceu* has less germplasm resource reserves and less cultivated varieties; most of new varieties are selected via mutation breeding, crossbreeding, etc., and have similar genetic backgrounds; new strains are similar to original strains or parent strains in most of characters. Moreover, *Hericium erinaceu* is mainly sold via fresh and dried products at early stage. Target characters of breeding mainly include fine mushroom shape, high yield, etc. There always exists a contradictory relation between yield and quality, thereby leading to high yield without fine quality or fine quality without high yield. Moreover, degeneration of strain vitality and living contaminants are also problematic issues in scale production to trouble the cultivation industry of *Hericium erinaceu*, which will cause huge economic losses to cultivation peasant households and enterprises.

In recent years, with the development of deep processing industry of *Hericium erinaceu*, there is an ever-increasing quantity demanded for high-quality *Hericium erinaceu*. Therefore, it is in urgent need of breeding high-quality new germplasms with high yield, short production cycle, strong anti-living contaminants ability, and high content of active ingredients, so as to satisfy the demands for the deep processing industry of *Hericium erinaceu* and promote production effectiveness of enterprises.

SUMMARY OF INVENTION

The present invention is aimed at providing a new fine-quality *Hericium erinaceu* strain. Through a great number of investigations and researches, the inventor team isolated from a wild *Hericium erinaceu* sample from Mount Arxan, Inner Mongolia and purified it to obtain a fine-quality *Hericium erinaceu* variety. This *Hericium erinaceu* variety greatly differs from the existing varieties in genetic background, has advantages such as dense and sturdy mycelia of its mother strain, fast growth of its stock culture, short harvesting time of first mushrooms, strong living contaminants resistance, high yield and short growth cycle, and meanwhile contains high content of active ingredients. The extract thereof can significantly improve alcohol-induced gastric mucosal damage.

The object of the present invention is to provide a new *Hericium erinaceus* strain HE015, and an inoculant product thereof.

Another object of the present invention is to provide a specific molecular marker of the strain HE015, and identification application thereof.

A further object of the present invention is to provide an extract of the strain HE015, and use thereof.

The above objects of the present invention are achieved by the following technical solutions:

According to the present invention, wild fungi were widely collected from more than 100 natural reserves (forest parks) of 26 provinces (autonomous regions) throughout China. Wild *Hericium erinaceus* strains were collected from Inner Mongolia, Hunan province, Guizhou province, Henan province, Heilongjiang province, Shandong, and other provinces (autonomous regions) and were subjected to systematic strain breeding to obtain a new high-yield *Hericium erinaceus* strain HE015 with polysaccharide in its fruiting body having a significant protection effect on chronic alcohol-induced gastric mucosal damage. The strain has high yield and short growth cycle, and its extract can increase body weight of the mice with chronic alcohol-induced gastric mucosal damage, lower the influence of the chronic alcohol-induced gastric mucosal damage on body weight of mice, thereby improving the gastric mucosa of the mice with chronic alcohol-induced gastric mucosal damage.

Therefore, the present invention provides the following application solutions:

A new *Hericium erinaceus* strain HE015; the strain was preserved in Guangdong Microbial Culture Collection Center on May 12, 2022 with an accession number of GDMCC No: 62464.

Provided is a *Hericium erinaceus* inoculant containing the above new strain HE015.

Furthermore, the *Hericium erinaceus* inoculant may further contain a mother strain medium in addition to containing the strain HE015.

The mother strain medium may be selected from a PDA medium consisting of 200 g/L potato, 20 g/L glucose, 20 g/L agar, and water as the remaining.

A molecular marker for detecting or identifying the above HE015, has a nucleotide sequence of SEQ ID NO.1.

A molecular marker combination for detecting or identifying the above HE015, has nucleotide sequences of SEQ ID NO.2 and SEQ ID NO.3.

The above molecular marker or molecular marker combination may be used as a target for detecting and identifying the strain HE015, which is of great significance in quality control of the strain HE015 after industrialization.

In addition, use of a reagent for detecting the above molecular marker or molecular marker combination in preparation of a kit for detecting or identifying the strain HE015, as well as a product containing a kit for detecting the above molecular marker or molecular marker combination, also shall fall within the protection scope of the present invention.

The reagent for detecting the above molecular marker or molecular marker combination, e.g., a molecular detection primer, is provided.

Specifically, as one of the alternative preferred embodiments, a primer for detecting or identifying the strain HE015 is a primer pair HE015-F8/R8;

as one of the alternative preferred embodiments, the primer for detecting or identifying the strain HE015 is a combination of a primer pair HE015-F2/R2 and a primer pair HE015-F4/R4;

the primer pair HE015-F8/R8 has a nucleotide sequence of SEQ ID NOs.8-9;

the primer pair HE015-F2/R2 has a nucleotide sequence of SEQ ID NOs.4-5; and the primer pair HE015-F4/R4 has a nucleotide sequence of SEQ ID NOs.6-7.

On this basis, the present invention further provides a method for detecting or identifying the strain HE015, which includes detecting by using a kit containing the above molecular marker detection reagent with a DNA of a sample to be tested as a template.

As one of the alternative preferred embodiments, the detecting or identifying method is a molecular identification technology, specifically, the above primers are used for PCR amplification with DNA of a sample to be tested as a template. When the amplification result is positive, it is identified as the strain HE015.

Specifically, when the amplification result of the primer pair HE015-F8/R8 is positive, it is identified as the strain HE015;

or, when the amplification results of both the primer pairs HE015-F2/R2 and HE015-F4/R4 are positive, it is identified as the strain HE015.

Further alternatively, the PCR amplification reaction system is as follows: 15 µL of 2×Taq Master Mix, 2 µL of DNA template (50 ng/L), 1 µL of a forward primer (10 µmol/L), 1 L of a reverse primer (10 µmol/L), and 11 µL of ddH$_2$O.

The PCR amplification procedure is as follows: primers are pre-degenerated at 95° C., degenerated for 15 sec at 95° C., annealed for 15 sec at 58° C., extended for 15 sec at 72° C., and then GOTO step2; 32 cycles are performed, and extension is performed for 10 min at 72° C.

Our research data show that the strain HE015 has high yield and short growth cycle; moreover, its extract can increase body weight of the mice with chronic alcohol-induced gastric mucosal damage, lower the influence of the chronic alcohol-induced gastric mucosal damage on body weight of the mice, thereby improving the gastric mucosa of the mice with chronic alcohol-induced gastric mucosal damage. Particularly, its fruiting body extract has a more significant effect.

Therefore, the present invention further provides a *Hericium erinaceus* polysaccharide extract, which is a precipitate obtained by water-extraction and alcohol-precipitation of a fruiting body of the strain HE015.

The present invention further provides a small-molecule *Hericium erinaceus* HE015 extract, which is a supernatant obtained by water-extraction and alcohol-precipitation of a fruiting body of the strain HE015.

Specifically, as an alternative solution, the extract is extracted by the following method:

step (1) fruiting body of the strain HE015 is crushed, with the addition of 10-30 times of water, stirred at 90-99° C. and extracted for 1-3 h, and then filtered to obtain a filtrate; the filtrate is concentrated under reduced pressure to a relative density of 1-1.5, and then added with ethanol such that the alcohol concentration is up to 70-90%, standing for 12-48 h at 2-10° C. to obtain a first bottom precipitate and a supernatant;

step (2) the first bottom precipitate obtained after standing in the step (1) is redissolved with 5 times of water, ethanol is added to regulate alcohol concentration to be 70-90%, standing for 12-48 h at 2-10° C. to obtain a second bottom precipitate; the second bottom precipitate was washed with 70-90% ethanol and acetone, frozen dried and crushed to obtain the HE015 fruiting body polysaccharide extract; and step (3) the supernatant after standing in the step (1) is concentrated under reduced pressure, frozen dried and crushed to obtain the small-molecule HE015 fruit body extract.

More specifically, the alternative operating conditions are as follows: step (1) fruiting body of the strain HE015 is crushed, with the addition of 20 times of pure water, stirred at 95° C. and extracted for 2 h, and then filtered to obtain a filtrate; the filtrate was concentrated under reduced pressure to a relative density of 1.10, and then added with 95% ethanol such that the alcohol concentration is up to 80%, standing for 24 h at 4° C. to obtain a first bottom precipitate and a supernatant.

More specifically, the optional operating conditions are as follows: step (2) the first bottom precipitate is redissolved with 5 times of pure water, 95% ethanol is added to regulate alcohol concentration to be 80%, standing for 24 h at 4° C. to obtain a second bottom precipitate; the second bottom precipitate was washed with 80% ethanol and acetone, frozen dried and crushed to obtain the HE015 fruiting body polysaccharide extract.

Finally, uses of the strain HE015, the inoculant containing the strain HE015, and the HE015 extract (in particular to its fruiting body extract) in preparation of a product having a protective effect on gastric mucosa or having an effect of treating or improving alcohol-induced gastric mucosal damage also shall fall within the protection scope of the present invention.

Moreover, products containing the *Hericium erinaceus* polysaccharide extract and/or small-molecule polysaccharide extract for protecting gastric mucosa or improving alcohol-induced gastric mucosal damage also shall fall within the protection scope of the present invention.

As one of the industrialization applications, specifically, extracts of the fruiting body of the cultivated HE015 strain can be applied in functional food, for example, compounded with raw materials such as *Rhizoma galangae, pericarpium citri reticulatae, Ficus carica*, Fructus Auranti, fructooligosaccharide, or xylooligosaccharide to prepare products for protecting gastric mucosa and improving functions of intestinal flora, in a dosage form of solid beverage, liquid strips, etc.

In practical industry, the cultivation of the new fine-quality *Hericium erinaceus* strain HE015 in the present invention can be achieved via the existing cultivation technologies of *Hericium erinaceus*.

The present invention has the following beneficial effects:

According to the present invention, wild fungi were widely collected throughout China and subjected to systematic strain breeding to obtain a new fine-quality *Hericium erinaceus* strain HE015 with high yield and short growth cycle. The genetic background of the strain HE015 is obviously different from that of the existing *Hericium erinaceus* species; therefore, the new strain is of important value and significance in supplementing fine-quality cultivated *Hericium erinaceus* varieties, meeting the market demand and promoting the space for enterprise development.

Our research data show that the strain HE015 has advantages such as dense and sturdy mycelia of its mother strain, fast growth of its stock culture, short harvesting time of its first mushrooms, strong living contaminants resistance, high yield and short growth cycle, and meanwhile contains high content of polysaccharide and other active ingredients. Its extract can increase body weight of the mice with chronic alcohol-induced gastric mucosal damage, lower the influence of the chronic alcohol-induced gastric mucosal damage on body weight of the mice, thereby improving the gastric mucosa of the mice with chronic alcohol-induced gastric mucosal damage. Particularly, its fruiting body extract has a more significant effect and thus, has a wide industrialization prospect.

Meanwhile, the present invention provides a specific molecular marker and detection product of the strain HE015, which provides a technical basis for the quality control of the strain HE015 identification and other correlated industries.

BRIEF DESCRIPTION OF DRAWINGS

FIG. 4A denotes polymorphic analysis of the primer HE015-F4/R4; FIG. 4B denotes polymorphic analysis of the primer HE015-F2/R2.

DESCRIPTION OF EMBODIMENTS

Figure 1:
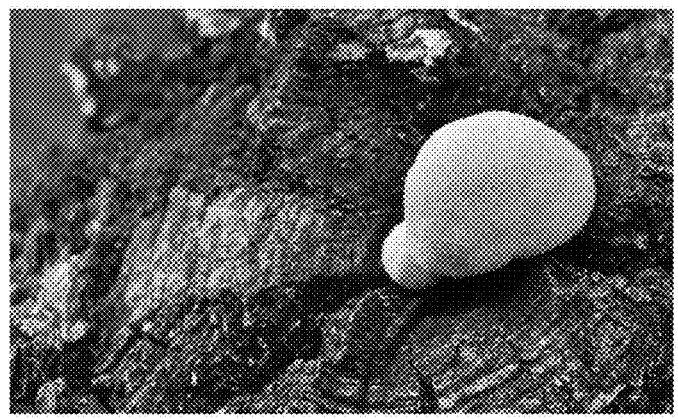
FIG. 1 shows a specimen picture (upper) and growing environment picture (lower) of a new *Hericium erinaceus* strain HE015.
Figure 1:

The present invention will be further described with reference to the accompanying drawings and detailed embodiments of the description, but the embodiments are not construed as limiting the present invention in any form. Reagents, methods and devices used in the present invention, unless otherwise specified, are conventional reagents, methods and devices in the art. Reagents and materials used in the following examples, unless otherwise specified, are commercially available.

Synthetic PDA-enriched medium used in the examples contains, in mass fraction, 20% potato+2% glucose+1% peptone+2% agar+0.3% potassium dihydrogen phosphate +0.15% magnesium sulfate+0.001% vitamin $B_1$, water as the remaining. The preparation method is as follows: potato was first cleaned and peeled, and then 200 g of the potato was weighed and cut into small pieces, added with water and well-cooked (boiled for 20-30 min, capable of being poked with a glass rod), filtered with 8-layered gauze; 20 g glucose, 10 g peptone, 20 g agar, 3 g potassium dihydrogen phosphate, 1.5 g magnesium sulfate, and 0.01 g vitamin $B_1$ were added to the filtrate, stirred well, slightly cooled and complemented with water to 1000 mL, and subjected to moist heat sterilization for 30 min at high temperature of 121° C. and high pressure of 0.11 MPa.

Mother strain medium (PDA medium) used in the examples: 200 g/L potato, 20 g/L glucose, 20 g/L agar, and water as the remaining. The preparation method is as follows: potato was peeled; 200 g were weighed, cut into small pieces and put to a boiler, added with 1000 mL water, heated and boiled in an induction cooker and kept for 20-30 min, filtered with 2-layered gauze; dregs were discarded; filtrate was supplemented to 1000 mL and added with 20 g glucose and 20 g agar, and then heated by soft fire, continuously stirred with a glass rod to prevent agar from sticking onto the bottom of the boiler or overflow; after the agar was completely dissolved, water was supplemented to the needed. Subpackage and sterilization: the solid medium was about ⅕ of the height of the test tube, a funnel may be used during subpackage to prevent the medium from staining the opening of the tube or bottle neck to avoid contamination. After subpackaging, the test tubes were plugged and 7 were bound up and sterilized for 20 min at 121° C., after temperature dropped to 80° C. around, the test tubes were put in an inclined plane.

Stock culture medium: 98% sorghum and 2% calcium carbonate in weight ratio. Preparation method is as follows: sorghum was added with water and boiled until "there was no white core and not well-cooked", moisture was dried in the air; the boiled sorghum was added with calcium carbonate and stirred well, subjected to high-pressure sterilization for 90 min at 126° C.

Cultivation material: 58% cottonseed hull, 30% hardwood saw dust, 10% wheat bran and 2% gypsum in weight ratio. Water content was about 65%.

Information and sources of other *Hericium erinaceus* market species and wild strains used in the examples are shown in Table 1:

TABLE 1

| Strain information | | | |
|---|---|---|---|
| | Strain number | Strain source | Way to obtain |
| Market species | I044 | Heilongjiang Provincial Jiagedaqi Academy of Agriculture and Forestry Sciences | Purchase |

TABLE 1-continued

Strain information

| | Strain number | Strain source | Way to obtain |
|---|---|---|---|
| | MC-HE-1 | Luhou No.1, Shandong | |
| | MC-JN-1 | Guangzhou Jiangnan Fruits and Vegetables Wholesale Market | |
| Wild species | HE015 M178 W461 E108 793 | Mount Arxan, Inner Mongolia Mount Mangshan, Hunan Mount Fanjing, Guizhou Mount Arxan, Inner Mongolia Baotianman, Henan | The strains were isolated and purified, and identified by ITS; the ITS sequence was subjected to ncbi sequence alignment to obtain 100% ITS similarity with *Hericium erinaceus* |

Example 1 Isolation and Identification of the New *Hericium erinaceus* HE015 Strain 1. Sample: in August 2017, our research team conducted large-scale collections and surveys of fungus resources in Mount Arxan, Inner Mongolia to obtain a *Hericium erinaceus* sample (FIG. 1), clustered on apricus dead woods.

2. Isolation process: a pure strain was isolated from the fruiting body of the above obtained *Hericium erinaceus* sample by tissue isolation and recorded as HE015.

Specific method was as follows: surface of the fruiting body of the *Hericium erinaceus* collected outdoor was wiped with 75% ethanol, torn down under aseptic conditions, and 0.2-0.5 mm×0.2-0.5 mm of internal bacterial context tissue was clamped and inoculated onto a PDA medium. The medium was placed into a 25° C. incubator and cultured in dark at a constant temperature, after mycelia overgrew the slope, pointed mycelia were taken, transferred, and purified to obtain the pure strain.

3. Identification of the strain HE015

(1) Morphological identification: macroscopic morphology and microscopic features of the strain HE015 strain were observed:

The fruiting body is stemless or has very short lateral stems; it is fleshy when fresh, soft leathery in later period, odorless and tasteless, and becomes cheese-like texture or soft suberin after dried and smells slightly sour.

Cap of the fungus is near spherical and its surface is snowy white to milky white, light milky yellow later on; it is rough and has a color of wood and microvillus without a texture of concentric ring after dried.

Tooth of the fungus is snowy white or cream color when fresh and becomes tawny after dried, contracted strongly; it is cylinder-shaped and tapers from bottom to top, fleshy when fresh and hard fibrous after dried, lengthens 10 mm and 1-2 pieces per millimeter.

The bacterial context has a color of wood, cheese-like texture or soft suberin after dried, and has pores without a ring zone.

Stem is white to milk white and soft suberin after dried.

Basidiospore is 5.8-7×4.8-5.9 μm, oval, colorless, thick-wall, and its surface has fine bosses and starch-like texture, cyanophilous.

(2) Molecular identification: the purified HE015 mycelia were transferred onto a plating medium covered with a cellophane film on the surface (synthetic PDA-enriched medium), and placed and cultured in the dark at a constant temperature of 25° C. After mycelia overgrew the plate and fresh mycelia were collected and ground at room temperature; genomic DNA was extracted by a full-automatic nucleic acid isolation machine matched with a genomic DNA extraction kit (magnetic beads) (Mabio, Art. No.: DNF628-05B), to obtain a DNA solution (DNA template), then the DNA solution was cold stored at −20° C. for further use.

The above obtained DNA template was subjected to ITS-PCR detection by universal primers ITS1/ITS4 (ITS1 as SEQ ID NO.11: TCCGTAGGTGAACCTGCGG, ITS4 as SEQ ID NO.12: TCCTCCGCTTATTGAT ATGC, synthesized by Sangon Biotech (Shanghai) Co., Ltd.) of ribosomal DNA internal gene region in fungi.

Composition of the PCR reaction system (30 μl in total) is shown in Table 2. PCR procedure is shown in Table 3.

PCR related reagents were purchased from Nanjing Vazyme Biotech Co., Ltd.

TABLE 2

ITS PCR system of the fungus

| Composition | Amount (μL) |
|---|---|
| 2 × Taq Master Mix | 15 |
| DNA template | 2 |
| PCR primer 1 (10 μmol/L) | 1.5 |
| PCR primer 2 (10 μmol/L) | 1.5 |
| ddH₂O | 10 |

TABLE 3

ITS PCR procedure of the fungus

| Temperature | Time |
|---|---|
| 94° C. | 5 min |
| 94° C. | 30 s |
| 55° C. | 30 s |
| 72° C. | 30 s |
| | 34× |
| 72° C. | 5 min |
| 25° C. | 1 min |

The PCR product was directly sent back to Beijing Genomics Institute for bi-directional sequencing. The sequencing results are shown in SEQ ID NO.10.

```
ITS sequences of the strain HE015 (SEQ ID NO.10):
GAAGGATCATTAATGAATTTGAAAGGAGTTGTTGCTGGCCTGAAACCCA

GGCATGTGCACGCTCCAATCTCATCCATCTTACACCTGTGCACCCTTGC

GTGGGTCCGTCGGCTTTGCGGTCGATGGGCTTGCGTTTTTCATAAACTC

TTATGTATGTAACAGAATGTCATAATGCTATAAACGCATCTTATACAAC

TTTCAACAACGGATCTCTTGGCTCTCGCATCGATGAAGAACGCAGCGAA

ATGCGATAAGTAATGTGAATTGCAGAATTCAGTGAATCATCGAATCTTT

GAACGCACCTTGCGCCCCTTGGTATTCCGAGGGGCACGCCTGTTCGAGT

GTCGTGAAATTCTCAACTCAATCCTCTTGTTATGAGAGGGCTGGGCTTG

GACTTGGAGGTCTTGCCGGTGCTCCCTCGGGAAGTCGGCTCCTCTTGAA

TGCATGAGTGGATCTCTTTTGTAGGGTTTGCCCTTGGTGTGATAATTAT

CTACGCCGCGGGTAGCCTTGCGTTGGTCTGCTTCTAACCGTCTTCGGAC
```

-continued
AACTTTCATCTCAACTTGACCTCGAATCAGGCGGGACTACCCGCTGAAC

TTAAGC

The sequencing results were subjected to sequence alignment on NCBI GenBank to find that it has 100% similarity with *Hericium erinaceus*.

The above macroscopic and microscopic features are integrated and combined with the identification results of the ITS sequence to determine that HE015 is *Hericium erinaceus*. The strain was preserved in Guangdong Microbial Culture Collection Center on May 12, 2022 with an accession number of GDMCC No: 62464 and address of 5th Floor, Building 59, 100 Mid. Xianlie Road, Guangzhou.

Example 2 HE015 Cultivation and Quality Comparison

In this study, two common market species (I044 and MC-HE-1) and four wild species of *Hericium erinaceus* strains (HE015, M178, W461, and E108) were cultivated and compared.

I. Experimental Method:

1. Medium Preparation (1) Mother strain medium (PDA medium): potato was peeled; 200 g were weighed, cut into small pieces and put to a boiler, added with 1000 mL water, heated and boiled in an induction cooker and kept for 20-30 min, filtered with 2-layered gauze; dregs were discarded; filtrate was supplemented to 1000 mL and added with 20 g glucose and 20 g agar, and then heated by soft fire, continuously stirred with a glass rod to prevent agar from sticking onto the bottom of the boiler or overflow; after the agar was completely dissolved, water was supplemented to the needed. Subpackage and sterilization: the solid medium was about ⅓ of the height of the test tube, a funnel may be used during subpackage to prevent the medium from staining the opening of the tube or bottle neck, to avoid contamination. After subpackaging, the test tubes were plugged and 7 were bound up and sterilized for 20 min at 121° C., after temperature dropped to 80° C. around, the test tube were put in an inclined plane.

(2) Stock culture medium: 98% sorghum and 2% calcium carbonate in weight ratio. In the afternoon of the previous day of seed production, components in the formula were weighed; sorghum was washed with fresh water for 2-3 times, and soaked with fresh water over the night. After soaking, sorghum was washed with fresh water and fished out, then boiled with water and continuously stirred to prevent from sticking at the bottom of the boiler until "there was no white core and not well-cooked", heating was stopped, the sorghum was poured into a sieve mesh and washed with fresh water; after thick substances were removed and the sorghum was spread out to dry surface moisture in the air; calcium carbonate was added and stirred manually well, and bagged. The medium was subjected to autoclaved sterilization for 90 min at 126° C., naturally cooled and put into an inoculation chamber for inoculation.

(3) Cultivation material: 58% cottonseed hull, 30% hardwood saw dust, 10% wheat bran and 2% gypsum in weight ratio. Raw materials were weighed according to the formula, and water was added in a material/water ratio of 1:(1.4-1.5), retention for 2 h to absorb adequate water, and finally, water content was regulated to about 65%.

2. Plating Methods (to Determine the Growth Rate of Mycelia):

A PDA medium sterilized at high temperature was taken, and about 15 mL of the medium was poured into a sterile plate; when the medium was solidified and cooled to room temperature, 2 mm×2 mm of a mother strain piece was inoculated in the center of the plate and cultured at a constant temperature of 25° C. 6 repeats were set per strain and cultured for 7-8 d; growth vigor, color, and growth rate of mycelia were observed and recorded every day.

3. Bag Culture Method:

15×56×0.05 cm of polypropylene plastic bags was prepared; 2 kg of cultivation materials were packaged per bag and compressed moderately, and then the openings of the culture bags were tightened. The culture bags were subjected to autoclaved sterilization for 90 min at 126° C., and cooled naturally; cover of the autoclave was opened, and the bags were taken out and put to an inoculation chamber. The stock culture piece was inoculated and then placed into a 25° C. culture room and cultured in the dark; the growth situation, growth vigor, color, growth rate, and whether there was living contaminants of mycelia were recorded every week. 20 bags were prepared per variety.

4. Comparison of fruiting body yields: mycelia were implanted into a mushroom house after overgrowing the culture bag and primordium emerged, placed onto frames and standing on the ground; temperature was controlled within 16° C.-20° C., not lower than 12° C. or higher than 23° C.; air humidity was controlled to about 90%; ground watering and space spraying may be available, but water was not allowed to be directly sprayed onto the fruiting body. Scattered light was ensured in the growth stage of the fruiting body, 200 lx-400 lx was appropriate, and fine ventilation environment was provided. After fruiting, shapes, average yield and other indicators of each variety of mushrooms were recorded in detail, respectively.

5. Analysis on the Active Ingredients of the Fruiting Body

The fruiting body of each variety of the harvested *Hericium erinaceus* was dried and crushed, and then the polysaccharide content in the *Hericium erinaceus* was determined with reference to the standard of the Ministry of Agriculture NY T1676-2008 Determination of Crude Mushroom Polysaccharides.

II. Experimental Result:

1. Growth Situation of Mycelia

As can be seen from the experimental results (Table 4), the strain HE015 mother strain has the fastest average growth rate of mycelia, and its growth vigor is equivalent to that of the market species MC-HE-1. The growth vigor of M178 is the sparsest and its growth rate is slower.

As can be seen from Table 5, the stock cultures of the 6 *Hericium erinaceus* varieties were inoculated and cultivated, and mycelia could be overgrown after 21-30 d of growth; there was no major difference between the growth rate and color of mycelia; the strain HE015 had the fastest growth rate and mycelia were overgrown only for 21 d; each variety had good growth vigor of mycelia, of which the strain HE015 and MC-HE-1 achieved better growth vigor; there was no living contaminant except W461 and MC-HE-1.

TABLE 4

Growth vigor and growth rate of mother strain mycelia of each *Hericium erinaceus* variety

| Variety | Growth vigor of mycelia | Color of mycelia | Average growth rate (mm/d) | Contamination |
|---|---|---|---|---|
| I044 | +++ | Pure white | 6.5 | No |
| HE015 | ++++ | Pure white | 7.3 | No |
| M178 | ++ | Pure white | 6.2 | No |
| W461 | +++ | Milky white | 6.7 | No |
| E108 | +++ | Pure white | 6.8 | No |
| MC-HE-1 | ++++ | Pure white | 7.1 | No |

Note: growth vigor of mycelia depends upon the white and dense degrees of mycelia; +, ++, +++, and ++++ denote that the growth vigor of mycelia enhances gradually.

TABLE 5

Growth vigor and growth rate of mycelia of each *Hericium erinaceus* variety at stages of cultivation

| Variety | Days of over-growing/d | Growth vigor of mycelia | Color of mycelia | Contamination |
|---|---|---|---|---|
| I044 | 30 | +++ | Milky white | No |
| HE015 | 21 | ++++ | Pure white | No |
| M178 | 23 | +++ | Pure white | No |
| W461 | 25 | +++ | Milky white | 2 bags |
| E108 | 23 | +++ | Pure white | No |
| MC-HE-1 | 22 | ++++ | Pure white | 1 bag |

Note: growth vigor of mycelia depends upon the white and dense degrees of mycelia; +, ++, +++, and ++++ denote that the growth vigor of mycelia enhances gradually.

2. Growth Situation of Fruiting Body

As can be seen from Table 6, the fruiting bodies of different varieties of strains greatly differ in appearance, biological character and yield. The first harvesting days of the 6 *Hericium erinaceus* varieties are within 14-18 d; mushroom transverse diameter is within 7.8-10.6 cm; mushroom longitudinal diameter is within 6.5-8.2 cm; average yield per bag is within 0.525-0.706 kg.

The strain HE015 has the shortest harvesting time of first mushrooms, the largest individual mushroom (transverse diameter and longitudinal diameter), and the highest average yield, near 10% higher than that of the MC-HE-1.

The variety M178 has the longest harvesting time of first mushrooms, smaller individual mushroom (transverse diameter and longitudinal diameter), and the lowest average yield.

TABLE 6

Biological character and yield of different varieties of *Hericium erinaceus*

| Variety | First harvesting days/d | Echinulation length/cm | Transverse diameter/cm | Longitudinal diameter/cm | Average yield (kg/bag) |
|---|---|---|---|---|---|
| I044 | 15 | Long | 8.4 | 6.9 | 0.554 ± 0.068 |
| HE015 | 14 | Moderate | 10.6 | 8.2 | 0.706 ± 0.095 |
| M178 | 18 | Long | 7.9 | 6.5 | 0.525 ± 0.070 |
| W461 | 14 | Short | 8.5 | 7.1 | 0.612 ± 0.055 |
| E108 | 16 | Moderate | 7.8 | 7.3 | 0.594 ± 0.072 |
| MC-HE-1 | 15 | Short | 9.0 | 7.8 | 0.650 ± 0.081 |

3. Analysis on the Active Ingredients of the Fruiting Body

As can be seen Table 7, in the fruiting bodies of the 6 *Hericium erinaceus* varieties, the polysaccharide content is M178>MC-HE-1>W461>HE015>E108>I044 from high to low in turn.

TABLE 7

Measured results of the polysaccharide content in the fruiting body of each *Hericium erinaceus* variety

| Variety | Polysaccharide content/% |
|---|---|
| I044 | 4.85 ± 0.21 |
| HE015 | 5.21 ± 0.36 |
| M178 | 5.68 ± 0.29 |
| W461 | 5.27 ± 0.35 |
| E108 | 5.13 ± 0.22 |
| MC-HE-1 | 5.38 ± 0.21 |

To sum up, the plating method was used; growth rate and growth vigor of mycelia of the strains to be selected were determined to assess the advantages and disadvantages of the different production strains; afterwards, culture bags were prepared and strains were inoculated by bag cultivation; growth rate and growth vigor of mycelia were observed as well as the fruiting body yield and active ingredients in the fruiting body were determined to further assess the quality and production performance of the strains to be selected; the optimal production strain of *Hericium erinaceus* (dense and sturdy mycelia, fast growth, high yield, and high content of target active ingredients of fruiting body) is preferred. Research results show that the average growth rate of mycelia of the 6 collected strains is 6.3-7.2 mm/d; mycelia were overgrown the culture bag for 21-30 d; the harvesting time of first mushrooms is 14-18 d; the average yield is 0.525-0.706 kg; the polysaccharide content of fruiting body is 4.85%-5.68%; the production performance greatly varies from the different quality of strains. During the selection of strains, our team is focused on the strain with dense and sturdy mycelia, fast growth, strong living contaminants resistance, high yield of fruiting body, and high content of active ingredients of polysaccharide on the basis of the data collected at present. By synthetic analysis, the strain HE015 has the advantages such as dense and sturdy mycelia of its mother strain, fast growth of its stock culture, strong living contaminants resistance, short harvesting time of first mushrooms, and high yield of fruiting body; even though its polysaccharide content is slightly lower than other strains, the strain HE015 strain is the optimal production strain via comprehensive comparison.

Figure 2:
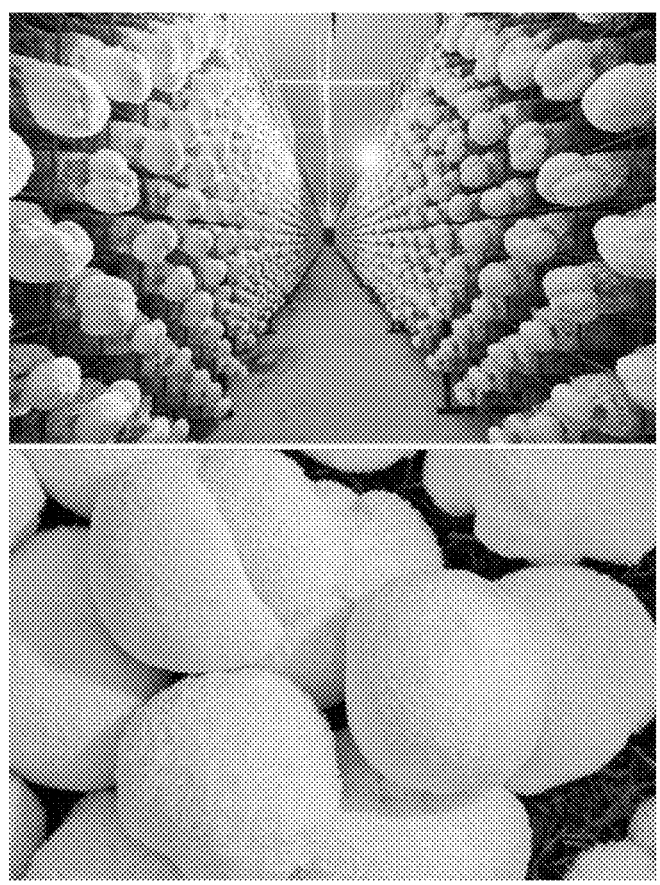
FIG. 2 shows a phenotype of a fruiting body of the strain HE015 after being domesticated.

Phenotype of the HE015 fruiting body is shown in FIG. 2.

Example 3 HE015 Genomic Sequencing and Development of its Specific Molecular Marker The third-generation (Nanopore)+the next-generation of sequencing strategies were applied in the present invention to obtain the strain HE015 genomic sequence information. The genome size is 39.45 Mb; N50 is 2.79 Mb; 17.23% of the sequences are repeated sequences; 11756 functional genes, 367 tRNAs and 25 rRNAs were obtained by annotation. Moreover, the whole genome re-sequencing (WGS) was adopted to obtain genomic sequence information of the widely collected market cultivated strains and wild species collected in the wild. The obtained data was aligned to genome of the strain HE015 to obtain a set of InDel variation sites; specific primers were designed purposefully and PCR amplified to obtain specific DNA fragments of the wild *Hericium erinaceus* HE015 strain, i.e., the molecular marker of the *Hericium erinaceus* HE015 strain. The specific experiment is as follows:

1. Genomic Sequencing and Assembly

Echinulation on the mature fruiting body of the strain HE015 strain was collected, and spores on the echinulation were washed out with sterile water; monokaryotic mycelia germinated by basidiospores were screened out and subjected to high quality DNA extraction. The sequencing was performed on the basis of the Illumina next-generation sequencing platform and Nanopore third-generation sequencing platform. For the next-generation sequencing library, the insertion size was 350 bp and the double-ended sequencing length was 150 bp. 300 ng of genomic DNA was fragmented by restriction enzyme digestion. The fragmented DNA was screened by magnetic beads to obtain a mean size of 200-400 bp. The selected fragments were repaired at ends, 3'adenylated and linked to an adapter; the PCR products were purified with magnetic beads. For the third-generation sequencing library, the genomic DNA was 26 Gneedle fragmented; more than 20 kb of fragments were selected by BluePippin, repaired at ends and added with a tail A, and linked with adapters at both ends of the fragments, thus preparing the DNA library. The constructed library was subjected to Qubit concentration quantitation and qualified after check; based on the effective concentration of the library and data output demand, the Nanopore platform was used for sequencing.

2 softwares of Nextdenovo and Necat were used to assemble the third-generation sequenced data, approximately divided into three parts: 0 Nanopore data was assembled using Nextdenovo and Necat, respectively; Nextdenovo used the following parameters: read cuffoff=3k, seed-cutoff=9k; Necat used the following parameters: GENOME_SIZE=45000000, MIN_READ_LENGTH=2000, PREP_OUTPUT_COVERAGE=40, NUM_ITER=3, others were default parameters. OO Output results were polished with Medaka, default parameters; 0 the assembled results were corrected according to the next generation data: pilon default parameters. Assembly results from different softwares were subjected to statistics; the assembled sequences were aligned and homologous sequences were assessed; the assembled sequence with the best assembly effect was selected as the strain HE015 genomic sequence.

2. WGS, Access and Screening of a Set of Indel Variation Sites

The widely collected *Hericium erinaceus* market species and wild *Hericium erinaceus* strains (HE015, W461, 1044, 793, E108, MC-JN-1, MC-HE-1, and M178) were inoculated onto plating media (synthetic PDA-enriched media); mycelia were collected and total DNA was extracted; after the genomic DNA was qualified and then fragmented by restriction enzyme digestion, afterwards, the fragmented DNA was purified, repaired at ends, added with A at a 3' end, and linked to a sequencing adapter, and subjected to selection of fragment size by magnetic beads, and then PCR amplified to form a sequencing library. The constructed library was subjected to quality testing, and the qualified library was sequenced at both ends by Illumina; reads were 150 bp to generate more than 5G of data.

Raw reads obtained by the sequencing were filtered to obtain Clean Reads for use in the following information analysis. Data filtering mainly includes the following steps: (1) reads with an adapter were removed; (2) reads having N content of greater than 10% were filtered; and (3) reads whose bases having a mass of lower than 10 exceed 50% were removed. The obtained clean reads were positioned onto the *Hericium erinaceus* HE015 genome by software BWA; InDel variations were detected by HaplotypeCaller (local haplotype assembly) of GATK, to obtain the final set of variation sites. Coverage of the variation sites and sites with high genotype quality were selected and primers were designed.

3. Specific Primer Design and PCR Amplification

Coverage of the variation sites and sites with high genotype quality were selected from the set of Indel variation sites, and primers were then designed. Our team screened three sets of primer pairs (HE015-F2/R2, HE015-F4/R4, and HE015-F8/R8). The primer information is as follows:

```
HE015-F2 (SEQ ID NO.4):
GCAGTGGTCTCAAAGGCCAT,

HE015-R2 (SEQ ID NO.5):
GAAACTTGGTGCTGCAGAGC;

HE015-F4 (SEQ ID NO.6):
CGGGGTCTGGGATGAGACC,

HE015-R4 (SEQ ID NO.7):
GAATGGGCAAATGAGGTCGGG;

HE015-F8 (SEQ ID NO.8):
CCTGCAAGCCATCGGACGTA,

HE015-R8 (SEQ ID NO.9):
CTTGGTCTACGCTACGTCC.
```

The primer pairs were synthesized by Sangon Biotech (Shanghai) Co., Ltd. PCR amplification was conducted by a BioRad PCR amplifier. Composition (30 μL in total) of the PCR reaction liquid is shown in Table 8.

TABLE 8

PCR system of the strain HE015 molecular marker

| Composition | Amount (μL) |
| --- | --- |
| 2 × Taq Master Mix | 15 |
| DNA template (50 ng/uL) | 2 |
| Forward primer (10 μmol/L) | 1 |
| Reverse primer (10 μmol/L) | 1 |
| ddH$_2$O | 11 |

PCR procedure is as follows: the primers were pre-degenerated at 95° C., degenerated for 15 sec at 95° C., annealed for 15 sec at 58° C., extended for 15 sec at 72° C., and then GOTO step 2; 32 cycles were performed, and extension was performed for 10 min at 72° C.

The PCR products were put to 1-1.5% of an agarose gel for electrophoresis (5 v/cm) for 25 min, and then placed into a gel imaging system and photographed.

4. PCR Amplification Result and Analysis (1) Amplification result of the primer pair HE015-F8/R8 is shown in FIG. 3.

Figure 3:
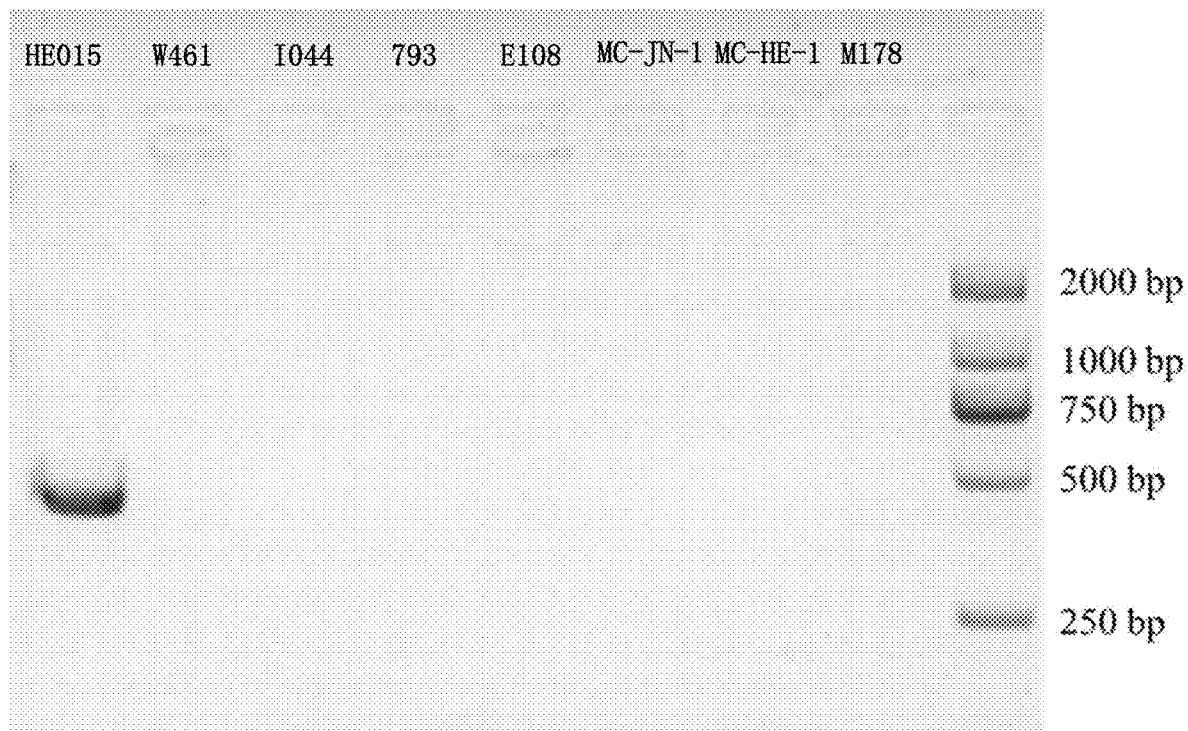
FIG. 3 shows an amplification result of a primer pair HE015-F8/R8 in the strain HE015 and market species.

As shown in FIG. 3, the primer pair HE015-F8/R8 amplifies a single amplified band with a size of 400-500 bp in the strain HE015; there is no band in other market strains or wild strains (FIG. 3).

The PCR product amplified by HE015-F8/R8 was sent to BGI Genomics for bi-directional sequencing. The obtained specific sequence information is shown in SEQ ID NO.1, with a size of 457 bp. The specific DNA fragment is the InDel molecular marker of the new *Hericium erinaceus* HE015 strain in the present invention.

Sequence of SEQ ID NO.1 (sequence of the HE015-
F8/R8 amplified product):
CCTGCAAGCCATCGGACGTATTGAGAAGTCCAAAATGAAGACGAAGAAA

GAAATCAGTAGATTGACAAGCAAGTGTCATAAGAGTTGGTCTCGTTGAA

GGAGAGCCGGACTTGTGCGCGATATCGCAGAGCAATGGAAGCGAAAAGA

CGCGCATCGAGGGAGACGACGAAGGGACGAAAAAAAGAAGGAGGGAAGG

GGGGGATGAAGATGAAGAAATTGAGAAAACAGCATCGGTGGCCGCAATA

ATCCCGTCGGCGTAGACACGGAAGCGAACAGGAAGCGAGCGCAGCGGGT

GTCTGAAGATACAGACAGTAATAGCAAAATGAACGCAGCAATGTTCCGG

TCGGAAGAAATGGCAATATGGGGGCAACGAATGGAAGGACAACTCACAA

TGAAACGCACTGATGCCAATTAATTTGCAGATTGAGATCATTCGTAGGA

Figure 4A:
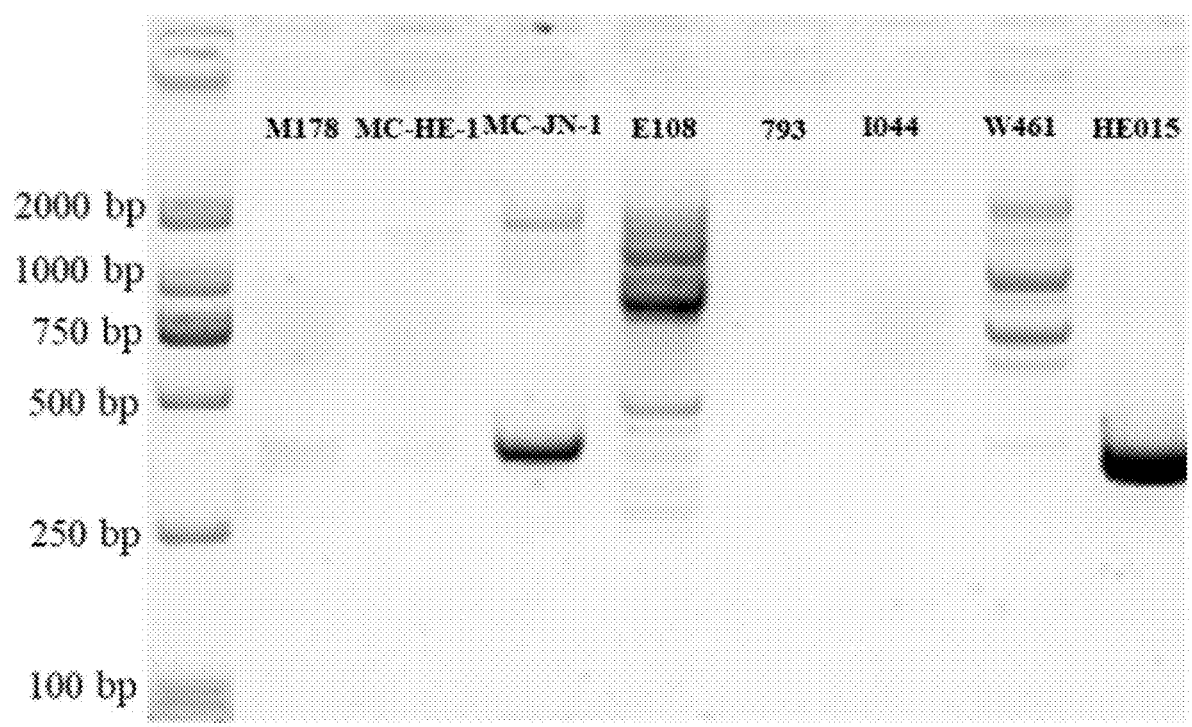
FIG. 4A and FIG. 4B show specific amplification results of primers.
Figure 4B:
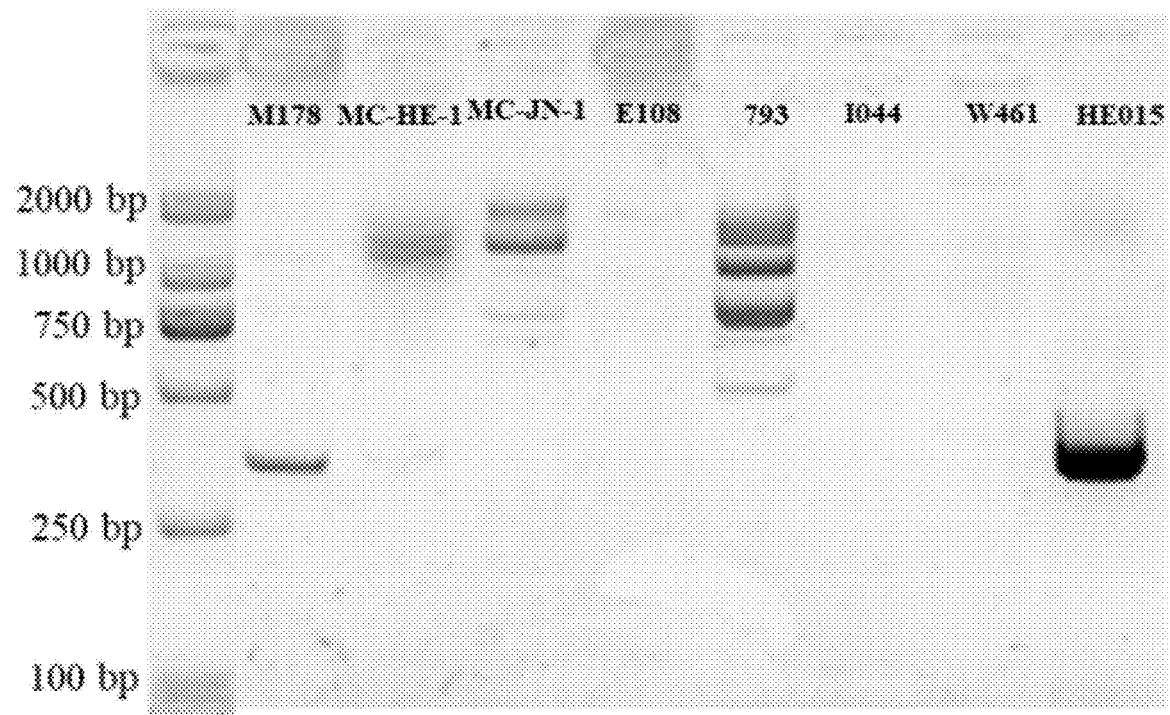

CGTAGCGTAGACCAAG (2) Amplification results of the primer pairs HE015-F2/R2 and HE015-F4/R4 are shown in FIG. 4A and FIG. 4B.

As shown in FIG. 4A, the amplified band of the HE015-F4/R4 in the *Hericium erinaceus* MC-JN-1 is close to that of the strain HE015 (the amplified product of HE015-F4/R4 in the strain HE015 is subjected to sequencing, the sequence information is shown in SEQ ID NO.2). The remaining 6 control strains have no band or have different bands. Therefore, the primer pair may distinguish the strain HE015 and MC-JN-1 from the rest 6 *Hericium erinaceus* strains.

As shown in FIG. 4B, the amplified band of the HE015-F2/R2 in the *Hericium erinaceus* M178 is close to that of the strain HE015 (the amplified product of HE015-F2/R2 in the strain HE015 is subjected to sequencing, the sequence information is shown in SEQ ID NO.3). The remaining control strains have no band or have different bands. Therefore, the primer pair may distinguish the strain HE015 and M178 from the rest 6 *Hericium erinaceus* strains.

HE015-F2/R2 and HE015-F4/R4 were integrated to effectively distinguish the strain HE015 from other strains.

Sequence of SEQ ID NO.2 (sequence of the HE015-
F4/R4 amplified product):
CATAGGCCTGTGTCCACCCGGGCAGGCCGCCCGGGTTTTCGGGGTGTAA

GATCATAGCTCGCTCCCGGCGGGGCCGGTTTTCGGGGTTCAGGGTGTCG

AACCTTTACCGGGATTATCAGGGGTCCTCGTTACACTCGCGTTACAGTT

ATTTATTTATTTAACGTTAGGCGCTCAGGACCCGACAGTGTTCGGGAGT

TTACCGGTTTTGAACATATATATGTACCTCCCTCAATACGCTAAACAAC

TGTCTTCTGTGTGAGGTCAGCAACGGAGATCAGATACCTCCCAGCTAAA

TATTCGAACTGTTCAATTTCTCGGGCAGATTTATCTAACCGGTTATATG

CTATGGACGAGCAGATAAGCGTCTACTTAATCCTTCTGGCCCTTGACGT

CCAACAGCCATTTCCCGACCTCATTTGCCCATTC

Sequence of SEQ ID NO.3 (sequence of the HE015-
F2/R2 amplified product):
GCAGTGGTCTCAAAGGCCATCCCAGGCAGCTATGACGAGGTTCAGGTGA

AATATCGCAGCCAAGGCACCTCTTGCCCATTGTATCTACAAAGCATACT

GAAGGACGAGGCACACATTGCCTAGTGCCACAAGTAGAATCAATTTTAA

GACAGCTGCCCCAGCAGGTGGTATCAAACGTTTCAAGAATAGATCACAA

ATGAGGTGTTATCTTACAATCCCAACATGTCTGCATGCCTACATCTCAT

CAACAAGACCACTTTCCCGACCAGTGCCCTACAATCTATCCAATATCTC

CTTCCATTCCTTCACAAATTCTTGTTCACTTGGCAGCATTTTGACCTTC

CATTCGACAATACCTAGCTTTCCATGTGAATTGCACACTGCAAGCTCTC

TCAACTTCTTCTGATGGGCACCTTTGTTGCTCTGCAGCACC

Results are summarized below:

(1) The primer pair HE015-F8/R8 (corresponding to the molecular marker SEQ ID NO.1) is used alone to completely distinguish the strain HE015 from other *Hericium erinaceus* strains.

(2) HE015-F2/R2 and HE015-F4/R4 (corresponding to the molecular markers SEQ NO.3 and SEQ ID NO.2) are used together to completely distinguish the strain HE015 from other *Hericium erinaceus* strains; the strain that the corresponding identical bands may be expanded by these two sets of primer pairs is the strain HE015.

Based on the above results, the present invention provides a product for detecting or identifying the strain HE015, which provides a technical basis for the quality control of the strain HE015.

Example 4 Preparation of the HE015 Extract

1. Preparation of the liquid-fermented HE015 culture:

The HE015 mother strain was enlarged step by step and then inoculated onto a liquid PDA medium, then placed into a table concentrator at 25° C. and 150 rmp, and cultured until the medium became yellowish-brown and was overgrown with mycelia, isolated to obtain mycelia; culture solution was concentrated under reduced pressure by a rotary evaporator; the mycelia and the fermentation concentrated solution were mixed and homogenated, frozen dried and crushed to obtain the liquid-fermented HE015 culture (HEF).

2. Preparation of the small-molecule HE015 fruit body extract (HEFX), and HE015 fruiting body polysaccharide extract (HEFP):

The HE015 fruiting body was crushed, added with 20 times of purified water, stirred and extracted for 2 h at 95° C. and filtered; filtrate was concentrated under reduced pressure to a relative density of 1.10; and then slowly added with 95% ethanol such that the alcohol concentration was up to 80%, standing for 24 h at 4° C. to obtain a supernatant and a lower precipitate; the supernatant was concentrated under reduced pressure, frozen dried and crushed to obtain the small-molecule HE015 fruit body extract (HEFX); the lower precipitate was redissolved with 5 times of water and added with 95% ethanol to regulate the alcohol concentration to 80%, standing for 24 h at 4° C.; and then cleaned with 80% ethanol and acetone, frozen dried and crushed to obtain the HE015 fruiting body polysaccharide extract (HEFP).

3. Preparation of the solid-cultured small-molecule HE015 mycelia extract (HESX) and the solid-cultured HE015 mycelia polysaccharide extract (HESP):

The HE015 mother strain was enlarged step by step and then inoculated onto a sterilized solid PDA medium, then placed into a 25° C. culture room until mycelia were overgrown; the culture was taken out and the portion with thick mycelia growth was selected and torn into small pieces with the addition of 20 times of pure water, and stirred and extracted for 2 h at 95° C. and filtered to obtain a filtrate; the filtrate was concentrated under reduced pressure to a relative density of 1.10; and then slowly added with 95% ethanol such that the alcohol concentration was up to 80%, standing for 24 h at 4° C. to obtain a supernatant and a lower precipitate; the supernatant was concentrated under reduced pressure, frozen dried and crushed to obtain the solid-cultured small-molecule HE015 mycelia extract (HESX); the lower precipitate was redissolved with 5 times of water and added with 95% ethanol to regulate the alcohol concentration to 80%, standing for 24 h at 4° C.; and then cleaned with 80% ethanol and acetone, frozen dried and crushed to obtain the solid-cultured HE015 mycelia polysaccharide extract (HESP).

Example 5 Effect of the HE015 Extract on the Improvement of Alcohol-Induced Gastric Mucosal Damage 1. Laboratory Animal Male KM mice, SPF grade, body weight of 18-22 g, 5-6 weeks of age, feeding temperature and humidity: 23±1° C. and 55±10%; 12 h day-and-night discontinuous illumination was used; conditions of the raising room were always kept stable, thereby ensuring the reliability of the test result. The mice took food and drank water freely.

2. Experimental Grouping

Male KM mice were adaptively raised for 7 d, and then randomly divided into the following 8 groups:
Blank control group 1: Control
Model control group 1: Model
Administration group 1: Positive
Administration group 2: HEF
Administration group 3: HEFP
Administration group 4: HEFX
Administration group 5: HESP
Administration group 6: HESX.

There were 14 mice in the Model group, and 13 mice in the other groups, and the mice were fed with an ordinary fodder.

3. Experimental Process

Experimental duration is 2 weeks:

First week: the mice in each administration group were prophylactically administered intragastrically once every day; and its administration concentration is shown in Table 9; meanwhile, the mice in the Control and Model groups were administered 0.3 mL of pure water intragastrically.

Second week: the mice in the Model and each administration groups were administered 0.3 mL of 60% ethanol intragastrically once per day for modeling, to induce a chronic alcohol-induced gastric mucosal damage mice model, and modeling was performed for a week; meanwhile, the mice in the administration groups were administered (administration concentration and dosage were the same as those in the first week), the protective effects of different administration groups on gastric mucosa were observed.

TABLE 9

Administration concentration and dosage of each group

| Group name | Administration concentration | Volume |
| --- | --- | --- |
| Control | Pure water | 0.3 mL |
| Model | 60% ethanol | 0.3 mL |
| Lansoprazole (Positive) | 0.35 mg/mL | 0.3 mL |
| Liquid-fermented HE015 culture (HEF) | 10 mg/mL | 0.3 mL |
| HE015 fruiting body polysaccharide extract (HEFP) | 10 mg/mL | 0.3 mL |
| Small-molecule HE015 fruit body extract (HEFX) | 10 mg/mL | 0.3 mL |
| Solid-cultured HE015 mycelia polysaccharide extract (HESP) | 10 mg/mL | 0.3 mL |
| Solid-cultured small-molecule HE015 mycelia extract (HESX) | 10 mg/mL | 0.3 mL |

Administration was stopped the night before the end of the experiment; the mice were not allowed to take food, but allowed to drink water. Eyeballs were picked out and blood was collected, and then the mice were killed by cervical dislocation; gastric tissues were taken and placed into 4% paraformaldehyde stationary solution for immobilization, for use in pathological examination.

Figure 5A:
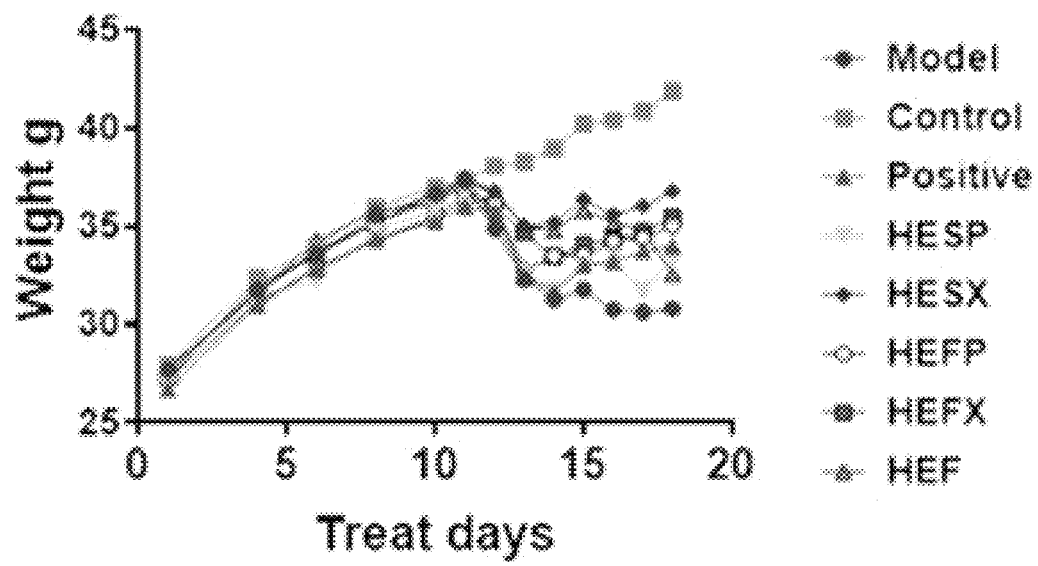
FIG. 5A and FIG. 5B show effects of the HE015 extract on body weight of mice with chronic alcohol-induced gastric mucosal damage (FIG. 5A) and survival curve (FIG. 5B); Control denotes normal group; Model denotes model group; Positive denotes positive drug group; HEF denotes liquid-fermented HE015 culture group; HEFP denotes HE015 fruiting body polysaccharide extract group; HEFX denotes small-molecule HE015 fruiting body extract group; HESP denotes solid-cultured HE015 mycelia polysaccharide extract group; and HESX denotes solid-cultured small-molecule HE015 mycelia extract group.

4. Experimental Results (1) Effects of the *Hericium erinaceus* HE015 Extract on Body Weight of the Mice With Chronic Alcohol-Induced Gastric Mucosal Damage As shown in FIG. 5A, during the prophylactic administration: by comparison, there is no significant difference (P>0.05) in the body weight among each group of mice, showing a trend of increasing. During modeling, the body weight of the mice in the Control shows a trend of increasing, while the body weight of the mice in other groups shows a downtrend; the body weight of the mice in the Model, administration groups and Positive is lower than that in the Control (P<0.01), indicating that the modeling greatly affects body weight.

At the end of the experiment, the body weight of the mice in each administration group is higher than that in the Model, of which the body weight of the mice in the HESX, HEFX, HEFP, and Positive is significantly greater than that in the Model (P<0.05), and the body weight of the mice in the HESX and HEFP is higher than that in the Positive, but there is no significant difference (P>0.05). The results indicate that the HE015 extract may reduce the effects on the body weight of the mice with chronic alcohol-induced gastric mucosal damage, especially groups HESX, HEFP, and HEFX achieve a significant effect, and even superior to the Positive.

Figure 5B:
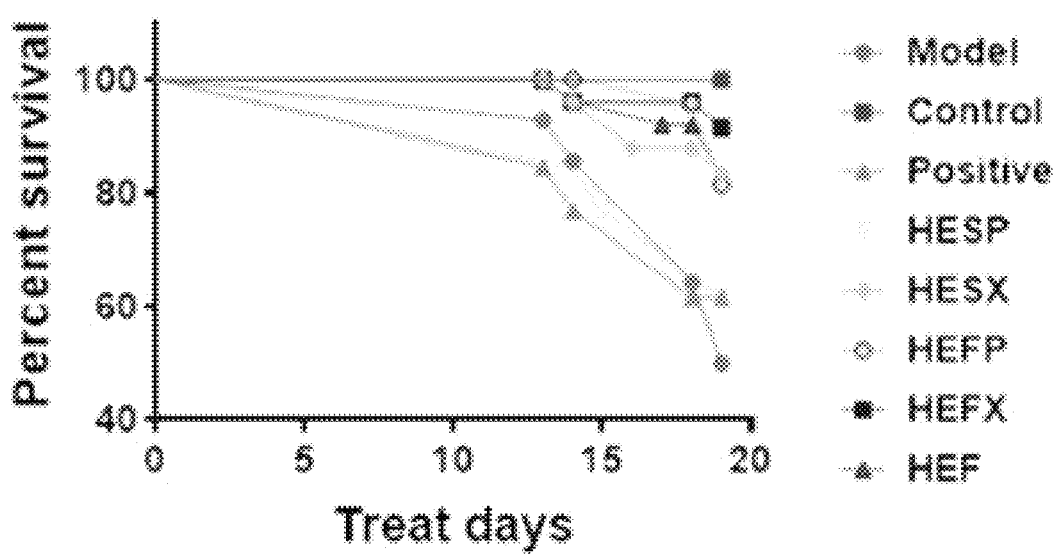

(2) Effects of the *Hericium erinaceus* HE015 Extract on the Survival Curve of the Mice with Chronic Alcohol-Induced Gastric Mucosal Damage As shown in FIG. 5B, compared with the Control, survival rate of the mice in other groups shows a downtrend, indicating that the modeling lays a significant impact on the survival rate.

At the end of the experiment, death count of the mice in the Model, Positive and HESP groups is obviously higher than that in other groups; and survival rates of the Positive and HESP groups are slightly higher than that of the Model group. The survival rate of the mice in the groups HEF, HEFP, HEFX, and HESX is significantly higher than that in the Model group, indicating that the HEF, HEFP, HEFX, and HESX have better efficacy and may prolong the survival time of individuals.

(3) Hematoxylin-Eosin (HE) Staining Results of Mice Gastric Tissues

Figure 6:
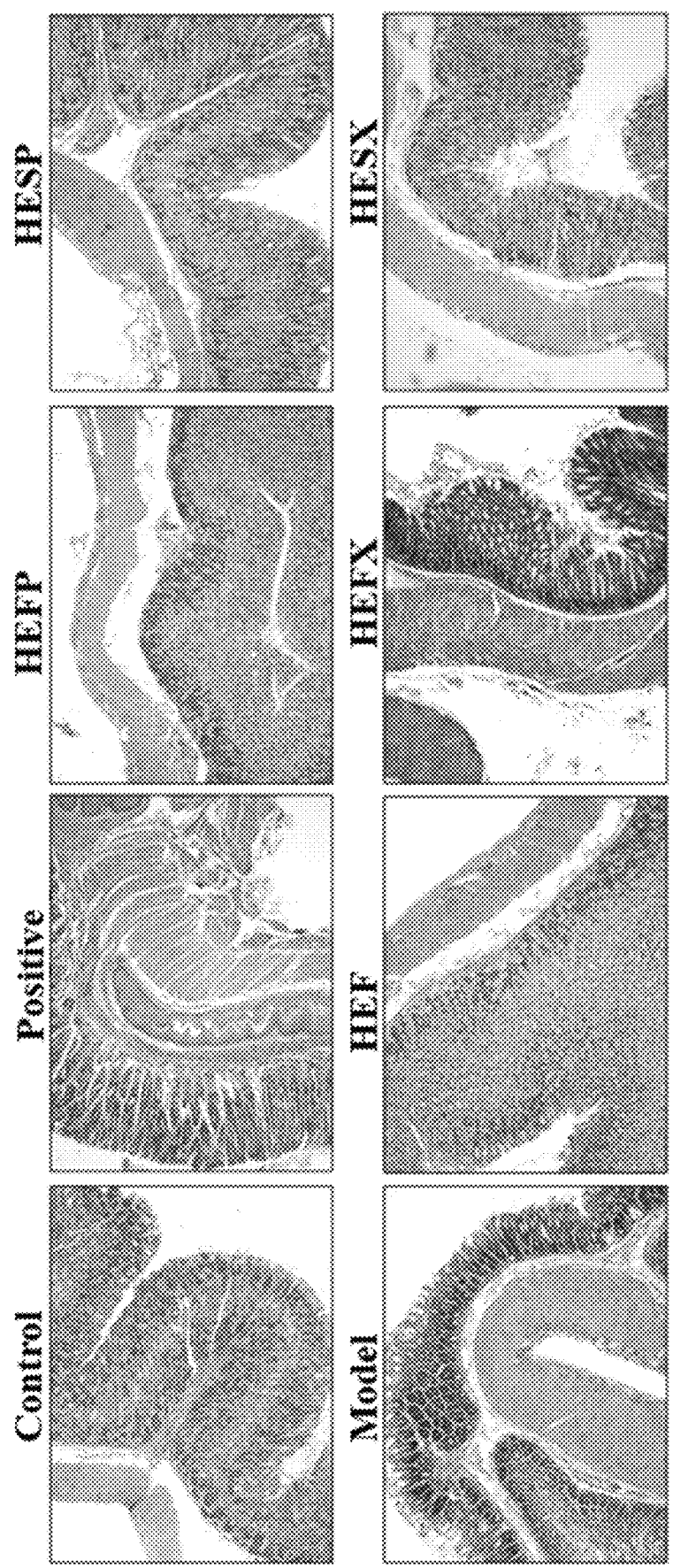
FIG. 6 shows effects of the HE015 extracts on the pathology of chronic alcohol-induced gastric mucosal damage.

The HE staining results of mice gastric tissues are shown in FIG. 6; mice in the Control have an intact and clear gastric mucosa structure of gastric tissues, intact cellular morphology, and regular gland arrangement, free of abnormal lesions such as tissue defect, bleeding, and inflammation. Mice in the Model suffer serious disseminated necrosis exfoliation of gastric mucosal cells, swelling cells, loose arrangement of cells and infiltration of inflammatory cells. Mice in the Positive suffer necrosis exfoliation of partial mucosal epithelial cells of the gastric tissue, loose arrangement of partial cells and infiltration of a small amount of inflammatory cells. Compared with the Model, mice in the HE015 extract administration groups have different degrees of improved gastric mucosa morphology, and the improvement is superior to the Positive.

In conclusion: the HE015 extracts HESX, HEFX, and HEFP as well as the positive drug Lansoprazole may increase the body weight of the mice with chronic alcohol-induced gastric mucosal damage, and decrease the effects of the chronic alcohol-induced gastric mucosal damage on the body weight of the mice; the extracts HEF, HEFP, HEFX, and HESX may extend the survival time of individuals; the extracts HEF, HEFP, HEFX, HESP, and HESX may improve the gastric mucosa of the mice with chronic alcohol-induced gastric mucosal damage. The results indicate that the HE015 extracts of the present invention may be used for improving chronic alcohol-induced gastric mucosal damage, and particularly, its fruiting body achieves a better effect.

The above examples are preferred embodiments of the present invention, but the embodiments of the present invention are not limited to the above examples. Any other changes, modifications, replacements, combinations, and simplifications made within the spiritual essence and principle of the present invention shall be equivalent substitution modes, and shall fall within the protection scope of the present invention.

What is claimed is:

1. A method of protecting gastric mucosa or improving alcohol-induced gastric mucosal damage, comprising: administering an effective amount of *Hericium erinaceus* strain HE015 extract, wherein the *Hericium erinaceus* strain HE015's representative sample is deposited at Guangdong Microbial Culture Collection Center under accession number of GDMCC No: 62464, and the *Hericium erinaceus* HE015 extract comprises *Hericium erinaceus* HE015 fruiting body polysaccharide extract, small-molecule *Hericium erinaceus* HE015 fruiting body extract, solid-cultured *Hericium erinaceus* HE015 mycelia polysaccharide extract, or solid-cultured small-molecule *Hericium erinaceus* HE015 mycelia extract.

2. A *Hericium erinaceus* inoculant, comprising *Hericium erinaceus* strain HE015 and a PDA medium, wherein the *Hericium erinaceus* strain HE015's representative sample is deposited at Guangdong Microbial Culture Collection Center under accession number of GDMCC No: 62464.

* * * * *